United States Patent

Owens

[11] Patent Number: 5,687,934
[45] Date of Patent: Nov. 18, 1997

[54] V/STOL AIRCRAFT AND METHOD

[76] Inventor: Phillip R. Owens, 1417 Kirby St., NE., Albuquerque, N. Mex. 87112

[21] Appl. No.: 691,471

[22] Filed: Aug. 2, 1996

Related U.S. Application Data

[60] Provisional application No. 60/001,930, Aug. 4, 1995.
[51] Int. Cl.$^6$ .................................................. B64C 21/02
[52] U.S. Cl. .................................................. 244/208
[58] Field of Search .............................. 244/207, 208, 244/209, 204

[56] References Cited

U.S. PATENT DOCUMENTS

| | | | |
|---|---|---|---|
| 1,903,818 | 4/1933 | Jutting. | |
| 2,004,256 | 6/1935 | Trey et al. | 244/207 |
| 2,213,916 | 9/1940 | Kerlin | 244/225 |
| 2,270,920 | 2/1942 | Backhaus | 244/40 |
| 2,334,070 | 11/1943 | Conley | 244/40 |
| 2,372,301 | 3/1945 | Stalker | 244/208 |
| 2,377,457 | 6/1945 | Stalker | 244/208 |
| 2,438,255 | 3/1948 | Stalker | 244/208 |
| 2,476,001 | 7/1949 | Stalker | 244/208 |
| 2,545,010 | 3/1951 | Stalker | 244/208 |
| 2,873,931 | 2/1959 | Fleischmann | 244/207 |
| 3,054,579 | 9/1962 | Bary | 244/42 |
| 3,085,740 | 4/1963 | Wagner | 244/207 |
| 3,840,199 | 10/1974 | Tibbs | 244/40 |
| 3,887,146 | 6/1975 | Bright | 244/12 |
| 3,915,412 | 10/1975 | Tibbs | 244/42 |
| 3,917,193 | 11/1975 | Runnels, Jr. | 244/207 |
| 3,931,942 | 1/1976 | Alpert | 244/12 |
| 4,061,996 | 12/1977 | Gupta et al. | 244/207 |
| 4,117,995 | 10/1978 | Runge | 244/207 |
| 4,285,482 | 8/1981 | Lewis | 244/207 |
| 4,391,424 | 7/1983 | Bartoe | 244/207 |
| 4,709,879 | 12/1987 | Stafford | 244/12 |

OTHER PUBLICATIONS

1961, G. V. Lachmann—*Boundary Layer and Flow Control Its Principles and Application.*

Nov. 6, 1956, Fairchild Engine & Airplane Corp., Engineering Report No. MR–47—*Proposal for a Research Program Leading to the Optimization of Forced Circulation Systems for Stol Airplanes.*

Mar. 31, 1956, Department of Defense, Report No. 1339–7—*Flight Test Results on the Use of High Lift Boundary Layer Control Applied to a Modified Liaison Airplane.*

*Primary Examiner*—Galen L. Barefoot
*Attorney, Agent, or Firm*—Deborah A. Peacock; Donovan F. Duggan; Paul Adams

[57] ABSTRACT

Aircraft apparatus and method capable of V/STOL (vertical, short takeoff and landing) in addition to conventional flight. For V/STOL operation, induced lift is provided by blowing air over the upper surface of each wing through a duct installed near the leading edge. Intake air is supplied to the blowing fan through a duct installed near the trailing edge, thus providing suction as well as blowing. Two fans in series are required. The engine provides power not only to the propeller but also to a transmission which provides power to the pulleys driving the belt-driven fans.

10 Claims, 5 Drawing Sheets

V/STOL AIRCRAFT AND METHOD

GOVERNMENT RIGHTS

The U.S. Government has a non-exclusive paid-up license in this invention and the right in limited circumstances to require the patent owner to license others on reasonable terms as provided for by the terms of Contract No. AT (29-1) 789 awarded by U.S. Department of Energy.

CROSS-REFERENCE TO RELATED APPLICATIONS

This application claims the benefit of the filing of Provisional Application Serial No. 60/001,930, entitled *Aircraft Using Blowing and Suction on Wing*, filed on Aug. 4, 1995.

BACKGROUND OF THE INVENTION

1. Field of the Invention (Technical Field)

The present invention relates to vertical or short take-off and landing aircraft; and a method of using such aircraft.

2. Background Art

The theory of flight for fixed-wing aircraft goes back to Daniel Bernoulli's theorem, later proven by Venturi with his Venturi tube. This means that, for a fluid system in motion, if the velocity is increased the pressure decreases. This principle was used by the Wright brothers in their development of the airfoil used on the first airplane. They shaped the wings or airfoils so that as the airplane is moved through the atmosphere, the air on the curved upper surface would have to move farther, thus faster than the air at the lower surface, this velocity increase causing a corresponding decrease in pressure at the upper surface. When the pressure difference between the upper and lower surfaces of the wing became sufficient to cause a lifting force equal to or greater than the weight of the airplane, the aircraft rose.

During the 1920's and 1930's, various means were developed to increase the lifting effect of the airfoil. The autogiro (a free wheeling rotor on a conventional fixed-wing aircraft) was developed. Slots, flaps, and other devices that improved the flow of air over the airfoil were also developed. These enhancement techniques for flow of air over an airfoil are known as boundary layer control. In 1940, the Germans, using theories developed by Professor Prandtl in 1904, designed and flew an aircraft that applied suction over the wing flaps to improve takeoff and landing flight characteristics (see *Boundary Layer and Flow Control: Its Principles and Application*, Lachmann, Vol. I, Pergamon Press, New York, 1961, pp. 1, 89). The results obtained from these experiments were quite encouraging. Research on boundary layer control continued in other countries including England, France and the United States.

During the 1950's, interest in boundary layer control to reduce takeoff and landing distances led to studies by both the Fairchild Aircraft Co. (see Engineering Report No. MR-47, "Proposal for a Research Program Leading to the Optimization of Forced Circulation Systems for STOL Airplanes," Fairchild Engine and Aircraft Corp., Hagerstown, Md., 11/56, pp. 20, 22) and the Cessna Aircraft Co. (see Final Summary Report, Contract NONR 856(000), "Flight Test Results on the Use of High Lift Boundary Layer Control Applied to a Modified Liaison Airplane," Cessna Aircraft Co., 3/56, pp. 1,2,3,4,41,43). A Cessna Model L-19A liaison airplane was modified to add suction and blowing over the wing flaps. It was found that this reduced takeoff and landing distances by 25%, and the Cessna report indicated that further gain in performance was possible with improved and more powerful boundary layer control systems and careful initial design. As a result of these and other studies, blowing flaps were installed on U.S. Navy and Air Force aircraft and still are in use, to some extent, today. On jet aircraft, exhaust gases are bled from the engine and blown over the flaps to provide high lift during takeoff and landing.

Experiments have been made using internal ducts and slots to blow air over the wing to increase lift, and although these were successful in increasing the lift coefficient, it has been the belief that it would be impractical to provide the blowing system within the aircraft itself because of the weight and frictional horsepower penalty involved. U.S. Pat. No. 2,270,920, to Backhaus, entitled *Arrangement for Exhausting and Discharging Air from and into the Skin Layer* is typical of such experiments. Some vehicles use the ground effect principle to produce lift, but these require considerable forward speed to obtain the desired effect, and must be flown close to the ground or water surface.

Other representative prior art includes U.S. Pat. No. 4,285,482, to Lewis, entitled *Wing Leading Edge High Lift Device*, which discloses a slat segment faired into an airfoil, including a duct and nozzle structure. U.S. Pat. No. 4,117,995, to Runge, entitled *Aircraft Wing Lift Augmentation Device*, discloses wing ducts directing high velocity jet air over the wings. U.S. Pat. No. 4,391,424, to Bartoe, Jr., entitled *Method and Structure for Airfoil Thrust and Lift Control*, discloses selectively directable air flow to create or diminish lift. U.S. Pat. No. 4,709,879, to Stafford, entitled *Controlled Air-Flow Aircraft Capable of Vertical Flight*, teaches the provision of blowers to provide and control flow of air over an airfoil.

Useful aircraft design references include the book on performance and design by Daniel P. Rymer, entitled *Aircraft Design: A Conceptual Approach*, and the book on airfoil dimensions and characteristics by Ira H. Abbott and Albert E. Von Doenhoff, entitled *Theory of Wing Sections*.

Vertical flight is, of course, possible by other means. The helicopter built by Sikorsky and others has been quite successful, but it is limited in forward speed. The British "Harrier" Navy aircraft utilizes jet engines that can be rotated 90 degrees to provide the vertical thrust needed for takeoff and landing. This requires additional jets on the wings to maintain stability, and a very skillful pilot. Also, the heat and pressure created by the jet engines in the vertical position made it practical for use only on aircraft carriers having heavy metal decks. They would damage the concrete runways used in commercial aviation.

The U.S. is developing a similar aircraft using two propeller-driven engines which can be rotated 90 degrees to produce vertical thrust. This reduces the temperature/pressure problem, but again requires additional equipment to maintain horizontal stability, and a very skillful pilot. Two engines are required for this configuration.

The Department of Defense continues to pursue development of a vertical take off fighter aircraft, using complicated systems. The Russians have developed a vertical take off aircraft using a separate engine for vertical thrust.

An experimental "Pogo Stick" vertical take off and landing (VTOL) aircraft was developed in the U.S. using one propeller-driven engine. This could take off vertically after being placed on its tail, but was considered too dangerous for the pilot, and the project was abandoned.

SUMMARY OF THE INVENTION
(DISCLOSURE OF THE INVENTION)

The present invention is of a method of providing a high-lift airfoil comprising: providing the leading edge of the airfoil with a first elongate tangentially slotted duct; providing the trailing edge of the airfoil with a second elongate tangentlally slotted duct; and blowing high pressure, high velocity air through the first elongate tangentially slotted duct while providing suction to the second elongate tangentially slotted duct, thereby promoting laminar flow and increased lift for the airfoil. In the preferred embodiment, the tangentially slotted ducts are elongate and intersect elongate slots, preferably at an angle of approximately 22.5° elevation from the centerline of the airfoil. The first elongate tangentially slotted duct discharges air rearwardly over the airfoil while the second elongate tangentially slotted duct captures the air.

The invention is also of high-lift airfoil apparatus comprising: a first elongate tangentially slotted duct proximate a leading edge of the airfoil; a second elongate tangentially slotted duct proximate a trailing edge of the airfoil; means for blowing high pressure, high velocity air through the first elongate tangentially slotted duct; and means for providing suction at the second elongate tangentially slotted duct, thereby promoting laminar flow and increased lift for the airfoil. In the preferred embodiment, the first elongate tangentially slotted duct is of cylindrical configuration and tapers in diameter from wing at fuselage to wing tip. The first elongate tangentially slotted duct preferably comprises an elongate slot tapering in width from wing at fuselage to wing tip, and the second elongate tangentially slotted duct is of equal or greater volume than the first duct.

The invention is further of an aircraft apparatus comprising: a fuselage; a right wing and a left wing; a blower assembly; and a tail assembly. In the preferred embodiment, the fuselage supports the blower assembly and the right wing and left wing, and the right and left wings support the tail assembly. Preferably, the wings comprise one or more ailerons, the tail assembly comprises one or more "tailerons", and the ailerons and "tailerons" are synchronized for movement together. The wings preferably comprise a first elongate tangentially slotted duct proximate the leading edge thereof and a second elongate tangentially slotted duct proximate the trailing edge thereof, and the blower assembly supplies high pressure, high velocity air to the first duct and suction to the second duct, thereby improving laminar flow and lift for the wings.

A primary object of the present invention is to provide increased lift for an airfoil;

Another object of the invention is to provide an aircraft having a vertical or short takeoff and landing capability;

Still another object of the invention is the promotion of laminar air flow over the airfoil;

Yet another object of the invention is the provision of a highly efficient blower system for providing induced lift;

A primary advantage of the invention is its relative ease of manufacture;

Another advantage of the invention is its capability of conventional flight as well as vertical and short takeoff and landing capability;

Still another advantage of the invention is its increased maneuverability enabled by synchronized ailerons and "tailerons"™;

Yet another advantage of the invention is its commercial competitiveness with other aircraft.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (Best Modes for Carrying out the Invention)

The induced lift required for vertical takeoff or landing for a fixed wing aircraft may be calculated. For example, an aircraft weighing 3200 pounds with a wing area of 112 square feet would require the following velocity and volume of blown air to vertically lift the aircraft, assuming no forward motion, as follows:

$$L = C_L \frac{\rho V^2}{2} S$$

where

L=Weight $C_L$=Lift Coefficient, 0.70 (For angle of attack $\alpha$=0, see Dodge and Thompson, entitled *Fluid Hechanics*, pages 144 and 145)

$\rho$=Density of standard air=0.002378 slug/ft$^3$

S=Effective Wing Area=112 sq. ft.

then $$V^2 = \frac{2L}{C_L \rho S} = \frac{2 \times 3200}{0.70 \times .00238 \times 112}$$

$$V = 185 \text{ ft/sec} \times \frac{15}{22} = 126 \text{ mph (sea level)}$$

assume

Slot Width ("SW")=0.006C (from Cessna Report, see line 20, page 2)

Where C=Chord Length, assumed to be 5 ft. (60 in.) near fuselage, and 3 ft. (36 in.) near wing tip (each wing) therefore SW=0.006×60=0.360 in. (at fuselage)
SW=0.006×36=0.216 in. (near tip)

$$\text{Average } SW = \frac{0.360 \times 0.216}{2} = 0.288 \text{ in.}$$

For slot length of 14 ft. (assumed)
Slot Area=0.288×1/12×14 ft.=0.336 ft$^2$
Volume of blown air required:
 Volume (Q)=velocity (V)×Area (A)
 V=185 ft/sec×60=11,100 ft/min.
 Q=11,100×0.336=3,730 cubic ft/min (CFM)
assume
Fan capacity of 4,000 CFM (each wing). System pressure estimated to be:

| | |
|---|---|
| 9 in. | (velocity pressure) |
| 2.5 in. | (static pressure) |
| 11.5 in. | Total, Water Pressure |

The invention is not limited to the weight and dimensions set forth above. Varying weights and dimensions will result in different calculated numbers and results.

Figure 1:
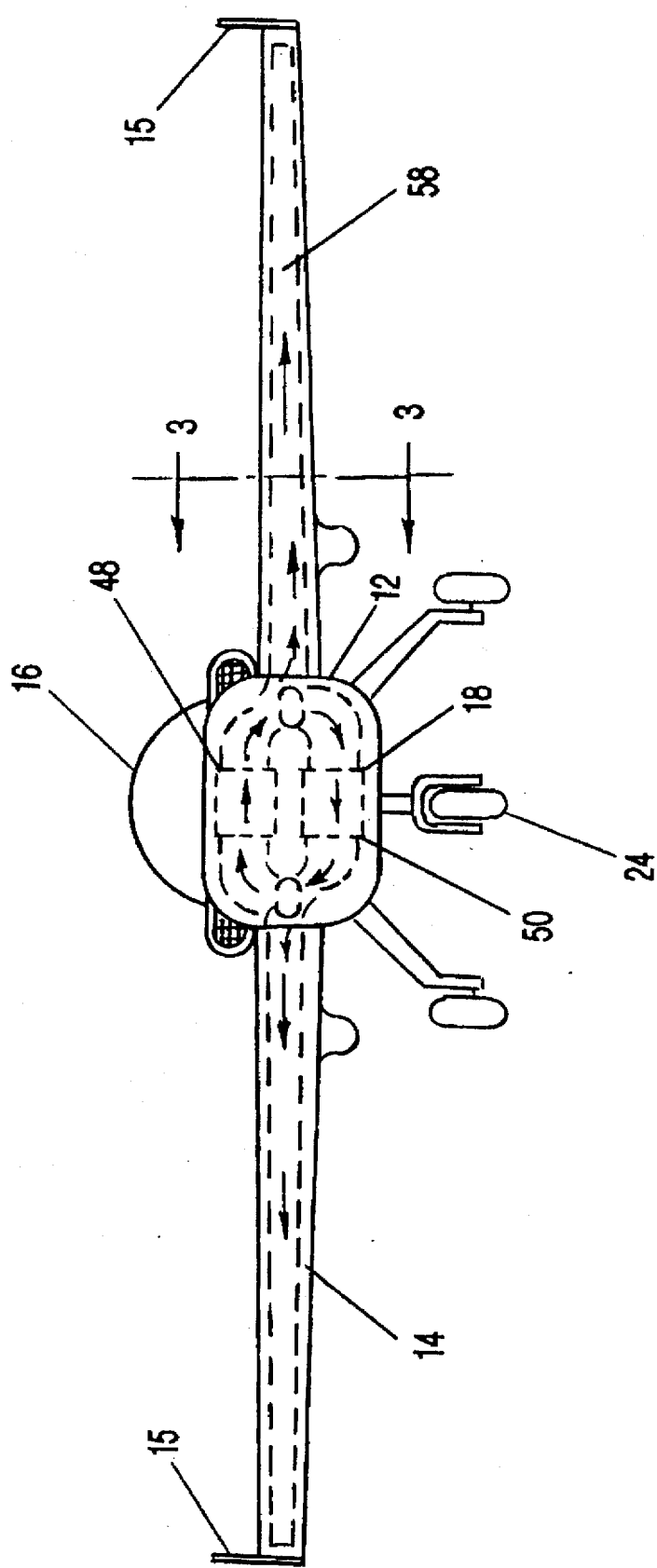
FIG. 1 is a front view of the aircraft apparatus.
Figure 2:
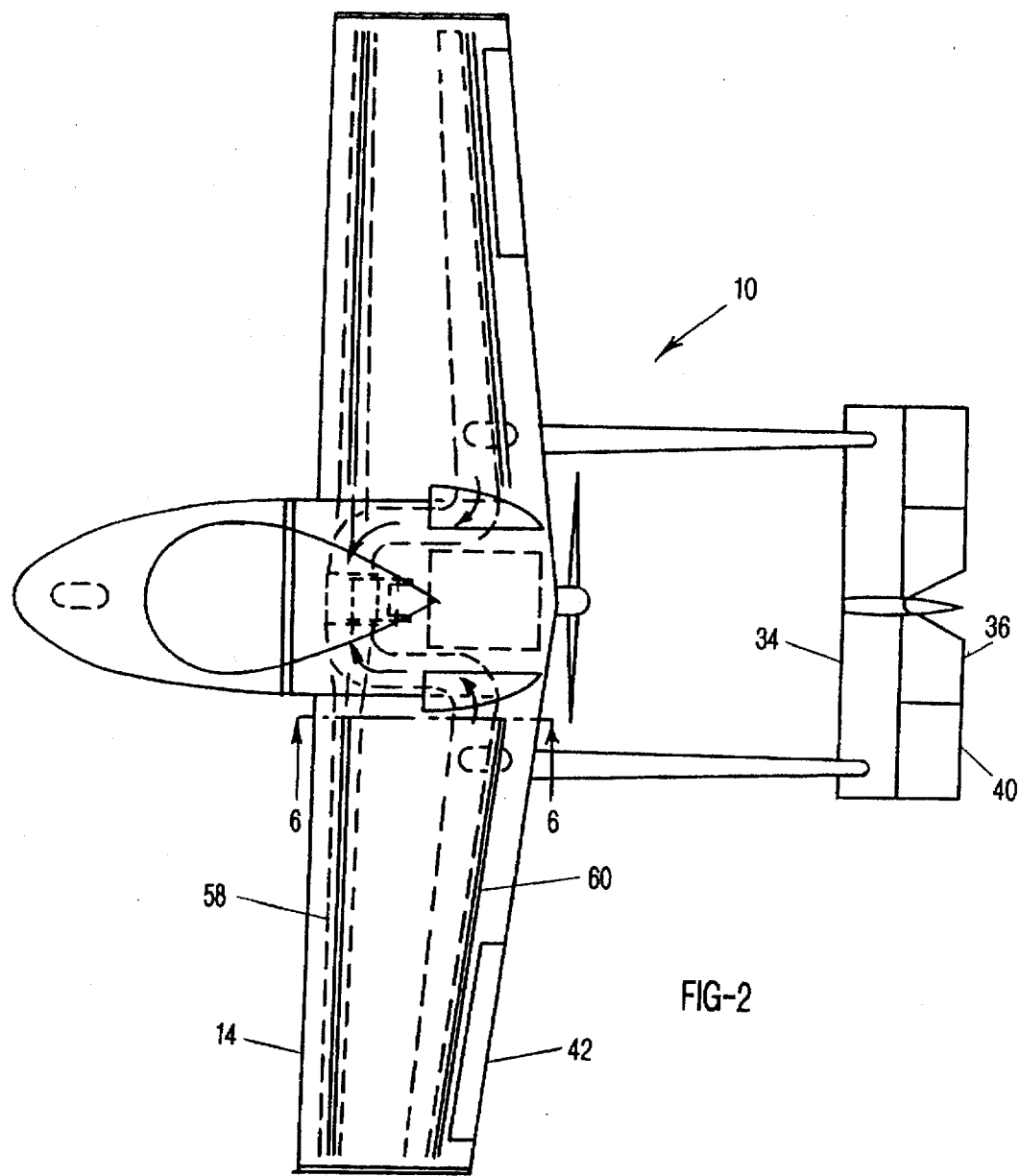
FIG. 2 is a top view of the aircraft apparatus sectioned at 6—6.

The preferred embodiment of the aircraft apparatus is depicted in FIGS. 1–10 of the drawings. FIGS. 1 and 2 show front and top views of aircraft 10, respectively. Aircraft 10 comprises fuselage 12 which is of semi-monocoque aluminum alloy construction, or the like. Fuselage 12 provides cabin 16 for personnel and houses or supports the other components of aircraft 10, including blowing system 18 and engine 20, wing 14, tail assembly 22 and landing gear 24. It includes a plexiglass canopy 26 and roll bar 28 to protect occupants in the event of a "flipover." Wing 14 further comprises wing plates 15 which provide side gust protection and prevent wing tip stall.

Figure 6:
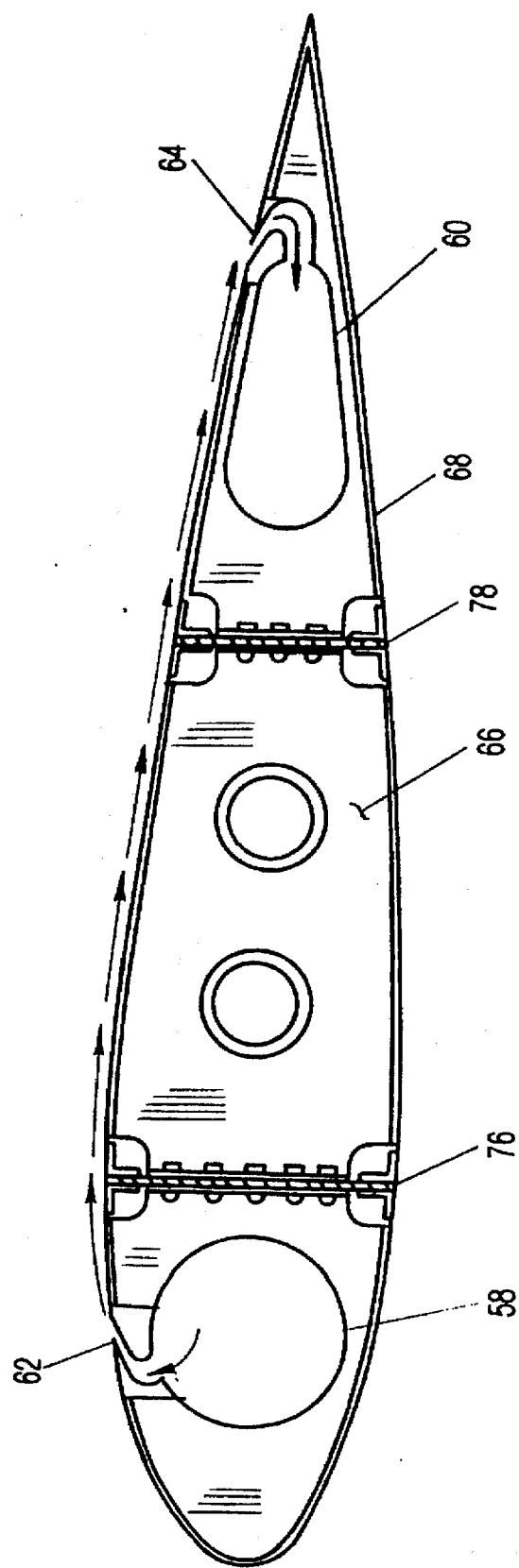
FIG. 6 is an enlarged view of the section taken at 6—6 in of FIG. 2 (4° angle of incidence not shown)

With reference to FIG. 6, the wing 14 also includes the front and rear spars 76,78 which are attached to the fuselage and are the main structural members. The ribs 66 (only one shown) is attached to the spars 76,78 and provides the contour of wing 14. Ribs are spaced at 15 in. center to center. Cutouts are provided in the ribs 66 to accept the blowing and suction ducts 58,60. The ducts 58,60 are glued, soldered, or otherwise fastened to the ribs 66 to dampen vibration and provide additional stiffness to the wing. The skin 68 is wrapped around the wing 14 to complete the contour, and is fastened to the duct slots 62,64 where the slots 62,64 meet the upper surface of the wing.

Tail assembly 22 comprises twin tail booms 30 attached to wing 14. Tail assembly 22 also comprises semi-monocoque aluminum construction and comprises the usual vertical 32 and horizontal stabilizers 34. Other control surfaces include standard elevators 36, rudder 38 and "tailerons"™ 40 which are synchronized with aileron 42 operation. Control cables 44 for operating the various control surfaces pass through booms 30. Landing gear 24 is of standard design for this type aircraft and is of tricycle configuration. The nose gear is castered while the main gear is equipped with brakes. The gear 24 is normally non-retractable and may be equipped with fairing to reduce drag.

Figure 7:
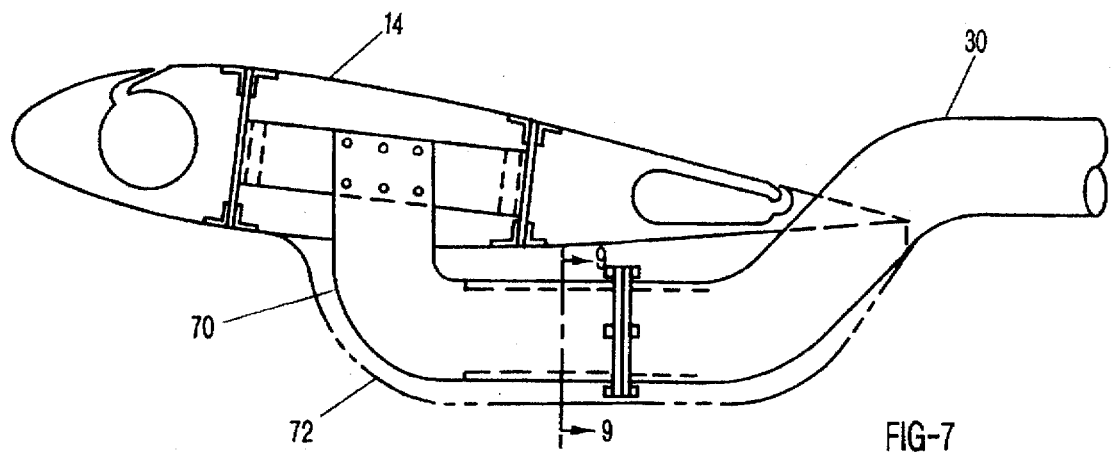
FIG. 7 is an enlarged view of the section taken at 7—7 of FIG. 2 of FIG. 1, showing the tail boom support structure.
Figure 8:
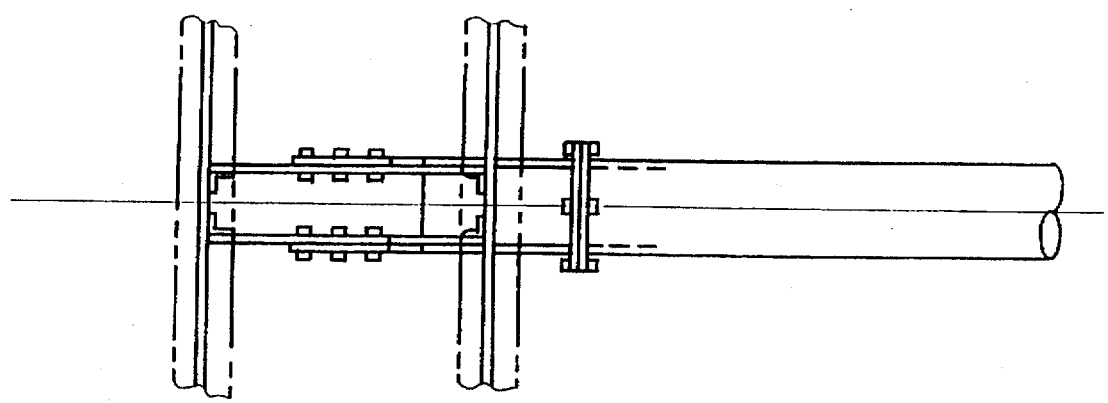
FIG. 8 is a top view of the FIG. 7 structure.
Figure 9:
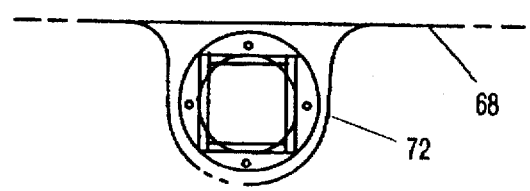
FIG. 9 is a detail of FIG. 7 of the support structure sectioned at 9—9.

As shown in FIG. 7, tail booms 30 are uniquely attached to the underside of wings 14. This, of course, further minimizes turbulence and provides unobstructed air flow over the airfoil. The tail boom support structure 70 attaches the tail boom to the wing 14 as shown in FIG. 7. The fairing 72 encloses the support structure and provides stream lining.

Engine 20 provides power to the propeller 46, blowing system 18 and other required auxiliary equipment, including avionics. It is suited to the size, weight and demands of the aircrafts for this application, a commercially available 225 horsepower 2600 rpm air cooled engine is preferred, although other similar engines could be used.

Figure 3:
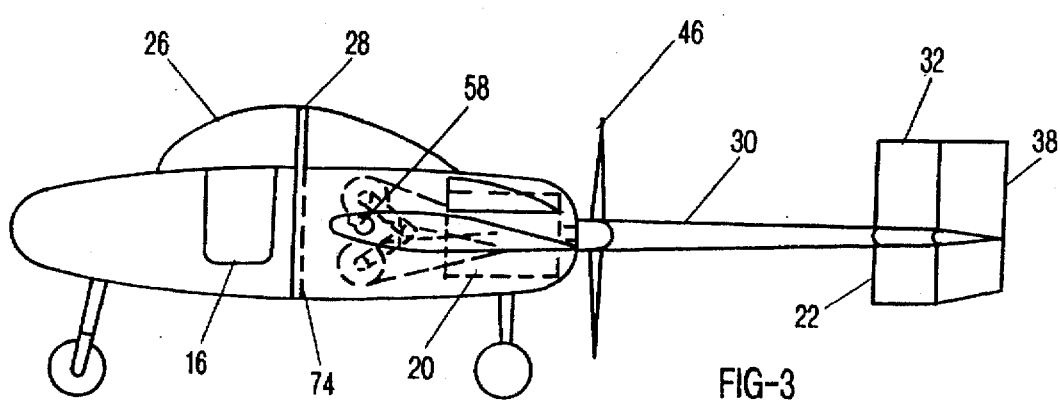
FIG. 3 is a side view of the aircraft apparatus with the wing shown cutaway at 1—1'.
Figure 4:
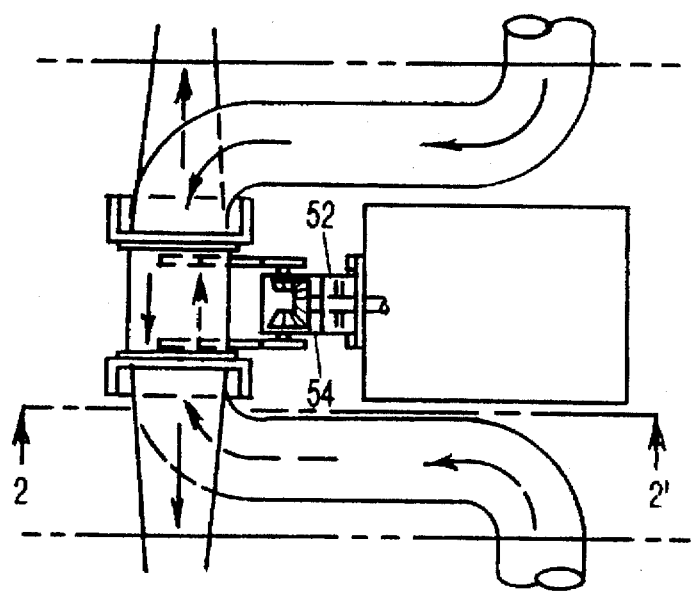
FIG. 4 is a top view of the blower system.
Figure 5:
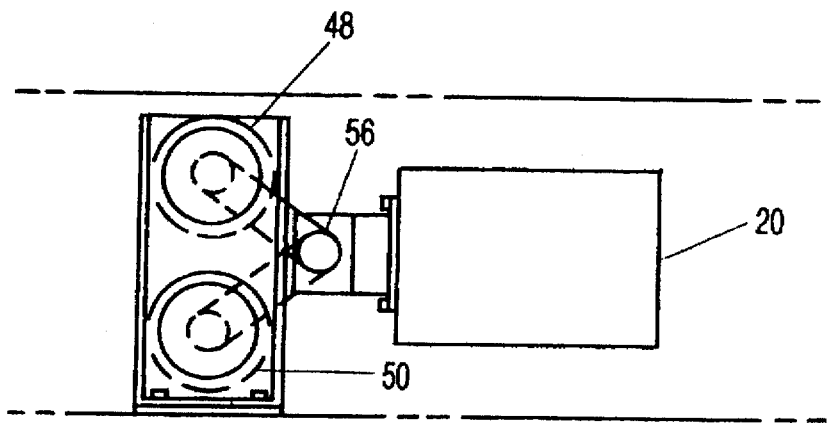
FIG. 5 is a side view of the blower system, sectioned at 2—2' of FIG. 4.
Figure 10:
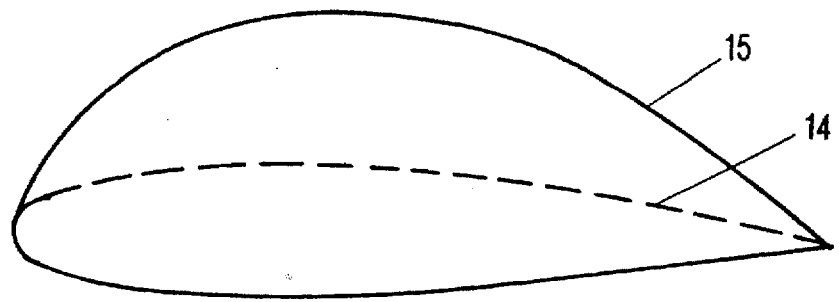
FIG. 10 is a side view of FIG. 1, of the wing showing the wing tip end plate (4° angle of incidence not shown).

As shown in FIGS. 1, 2 and 3, engine 20, in addition to driving propeller 46, also drives blowing system 18 comprising fans 48 and 50. As shown in FIGS. 4 and 5, fans 48 and 50 are driven through a transmission system comprising clutch 52, gearbox 54 and pulley assemblies 56. Gears 54 step up engine revolutions in the ratio of 3:2; pulley assemblies 56 transmit the increased revolutions to fans 48 and 50. The clutch 52 provides for engagement or disengagement of the blowing system at any time. A firewall 74 separates the cabin from the engine compartment and includes heat and sound insulation. Propeller 46 is a commercially available 2-bladed "pusher" type equipped with variable-pitch control.

As shown in FIG. 1, air flows in a circuit comprising the suction duct 60 and slot 64 of the left wing, through fan 50, to the blowing duct 58 and slot 62 of the right wing, over the wing to suction duct 60 and slot 64, from suction duct 60 and slot 64 of the right wing, through fan 48, then to the blowing duct 58 and slot 64 of the left wing. As shown in enlarged section in FIG. 6 wing or airfoil 14 comprises elongated cylindrical blowing duct 58 and elongated suction duct 60. Blowing duct 58 is 9" in diameter at the wing root and tapers to 6" diameter at the wing tips. Suction duct 60 is of similar or greater volume but of different configuration, as shown.

As shown in FIG. 6, elongate slots 62 and 64 tangentially intersect ducts 58 and 60, respectively. Slots 62 and 64 also extend the entire length of the wing 14 but are oriented oppositely to each other. Slot width is calculated, as follows, as an example:

SW=0.006C, where SW=slot width and C=chord of the wing.

Each slot is elevated at preferably approximately 22.5° above the centerline of the airfoil 14. Slot 62 provides high velocity, high pressure air from fan 50 to the forward upper airfoil surface, while slot 64 provides vacuum or suction to the rear of the upper airfoil surface. Since each fan is capable of supplying approximately 4,000 cubic feet of air per minute at approximately 11.5 in.

H$_2$O pressure, using the pressure side and suction side of each fan in series, or "push-pull," significantly increases the volume and velocity of air flow over the upper airfoil surface, thus, promoting increased lift.

Significant also is the configuration of slots 62,64 relative to ducts 58,60. The tangential intersection of the elongate slots 62,64 with ducts 58,60 at an angle of preferably approximately 22.5° with the airfoil centerline promotes laminar rather than turbulent flow over the airfoil, thus also promoting increased lift. The width of slot 62 also tapers in configuration (e.g., from 0.360" wide at the fuselage end of the wing to 0.216" wide at the wing tips) depending upon wing chord. Slot 64 is at least equal in width to slot 62.

The forward thrust created by air pressure against the forward wall of the blowing duct is offset by the rearward thrust created by air pressure against the rearward wall of the suction duct. The transverse thrust of fan 48 is offset by the transverse thrust of fan 50 which is in the opposite direction.

An additional advantage of the in-line blowing system in which suction air from the right wing is blown over the left wing, and vice versa, is that in the event of failure of one fan the system will not become completely unbalanced. There still will be blowing air over one wing and suction on the opposite wing.

In operation, vertical or short takeoff capability is provided by the induced lift created by the blowing system. High pressure, high velocity air is blown over the upper surface of the wings and captured or retrieved by the slotted suction ducts.

The propeller is at low pitch providing only sufficient "propwash" over the control surfaces for stability and maneuverability. As the aircraft rises, the rudder provides yaw control, the elevators provide pitch control and the tailerons™, acting with the ailerons, provide roll control.

As the aircraft leaves the ground, the propeller pitch is increased to provide forward thrust. When the aircraft reaches or exceeds the speed required for level flight (approximately 110 miles per hour at sea level), the fans may be turned off and the aircraft flown in the conventional manner. In landing, the procedure is reversed, with the fans being turned on as the propeller pitch is lowered to reduce forward speed.

Industrial Applicability

The invention is further illustrated by the following non-limiting example.

For gross aircraft weight approximating 3200 pounds, the preferred engine is an aircooled TCM 470 providing 225 bhp at 2600 rpm. Overall length of the aircraft is 28 feet with a wing span of 36 feet. Height is 8 feet 9 inches, payload is 400 pounds (2-place plus baggage), and fuel capacity is 50 gallons.

Operating characteristics include a stall speed (sea level) of 60 mph, maximum speed (sea level) of 211 mph, cruising speed (7000 ft.) of 142 mph, and a range of 500 miles. The maximum rate of climb is 900 ft/minute, and the service ceiling is 20,000 ft.

The wing area is 216 square feet with an aspect ratio of 6, a taper ratio of 0.71, a root chord of 7 feet and a tip chord of 5 feet. The airfoil is a NACA 23018. An angle of incidence of approximately 4° is preferred to provide level flight at relatively low speed. The blowing area is 112 square feet calculated for a surface 14 feet long, 5 feet wide at the fuselage and 3 feet wide at the wing tip.

The blowing system preferably comprises two Howden Fan Company in-line, mix-flow fans or equivalent fans (e.g., 400 mm, 4000 cfm, 4547 rpm, 12.5 bhp fans). The fans, driven by the pulley and transmission, draw approximately 30 horsepower from the engine crankshaft. Some modification of existing engines is required. The propeller is preferably a 7 foot, variable pitch pusher-type 2-blade Hartzell Propeller Company propeller or equivalent.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. An aircraft comprising:
    a fuselage;
    at least two wings, one wing on the left side of the fuselage and one wing on the right side of the fuselage, each of said wings having a high lift airfoil shape, each of said wings having a first elongate tangentially slotted duct proximate a leading edge of said airfoil and a second elongate tangentially slotted duct proximate a trailing edge of said airfoil;
    means for blowing high-pressure, high-velocity air through said first slotted duct along the upper surface of the wing and for sucking boundary layer air through said second slotted duct; and
    said means for blowing and sucking air comprising two sections, the intake of a first section in fluid communication with the second slotted duct on the right wing and the output of said first section in fluid communication with the first slotted duct on the left wing, and a second section having its intake in fluid communication with the second slotted duct on the left wing and its output in fluid communication with the first slotted duct on the right wing;
    whereby the simultaneous blowing and sucking of high-pressure air on each wing promotes laminar flow and increased lift for the aircraft.

2. The aircraft of claim 1 wherein said elongate slotted ducts extend substantially from the area adjacent the fuselage to the area adjacent the wingtip.

3. The aircraft of claim 2 wherein each of said elongate slotted ducts taper in width from the area adjacent the fuselage to the area adjacent the wingtip.

4. The aircraft of claim 3 wherein said second elongated tangentially slotted ducts have a slot area greater than the slot area of the first elongate tangentially slotted ducts.

5. The aircraft of claim 1 wherein said blowing and sucking means comprises a fan normally driven by an engine powering said aircraft.

6. The aircraft of claim 5 wherein said blowing and sucking means comprises two separate fans, one of said fans providing blowing and sucking in the first section of said means and a second fan providing means for blowing and sucking in the second section of said means.

7. The aircraft of claim 6 additionally including means for connecting said fans to the aircraft engine during landing and takeoff and disconnecting the fans during cruise flight.

8. In an aircraft comprising a fuselage, right and left wings, and an engine, the improvement for increasing the lift of the wings during landing and takeoff comprising:
    a pair of elongated slots proximate a leading edge of each wing; and a pair of elongated slots proximate a trailing edge of each wing;
    means for simultaneously blowing and sucking air driven by the aircraft engine;
    blowing duct means located in each of said wings proximate the leading edge and in longitudinal fluid communication with each respective blowing slot;
    sucking duct means located in each wing proximate the trailing edge and in longitudinal fluid communication with each respective sucking slot; and
    said blowing means comprising two sections, a first section having an intake attached to the sucking duct of the right wing and an output attached to the blowing duct of the left wing and a second section having an intake attached to the sucking duct of the left wing and an output attached to the blowing duct of the right wing.

9. The improvement of claim 8 wherein the slot width is selected from a range of 0.005 and 0.010 of the distance between the blowing slot and the sucking slot on the wing.

10. The improvement of claim 9 wherein the axis of the duct portion in fluid communication with the slot of each elongated duct is disposed at an angle of approximately 22.5 degrees above the center line of the wing section.

* * * * *